United States Patent
Balasubramanian et al.

(10) Patent No.: US 11,010,237 B2
(45) Date of Patent: May 18, 2021

(54) METHOD AND SYSTEM FOR DETECTING AND PREVENTING AN IMMINENT FAILURE IN A TARGET SYSTEM

(71) Applicant: Accenture Global Solutions Limited, Dublin (IE)

(72) Inventors: Ramkumar Balasubramanian, Bangalore (IN); Kamalesh Kuppusamy Kuduva, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 56 days.

(21) Appl. No.: 16/271,544

(22) Filed: Feb. 8, 2019

(65) Prior Publication Data
US 2020/0257585 A1 Aug. 13, 2020

(51) Int. Cl.
*G06F 11/00* (2006.01)
*G06F 11/07* (2006.01)
*G06N 20/20* (2019.01)

(52) U.S. Cl.
CPC ...... *G06F 11/0793* (2013.01); *G06F 11/0709* (2013.01); *G06F 11/0751* (2013.01); *G06N 20/20* (2019.01)

(58) Field of Classification Search
CPC .... G06F 11/08; G06F 11/079; G06F 11/3409; G06F 11/3452; G06F 11/3604; G05B 23/023

(Continued)

(56) References Cited

U.S. PATENT DOCUMENTS 7,627,667 B1* 12/2009 Rive ............... G06F 11/0748
709/224
7,627,677 B2* 12/2009 Raz ............... H04L 63/1458
709/225

(Continued)

OTHER PUBLICATIONS

Extended European Search Report, dated Jun. 2, 2020, pp. 1-9, issued in European Patent Application No. 20155888.9, European Patent Office, Munich, Germany.

(Continued)

*Primary Examiner* — Sarai E Butler
(74) *Attorney, Agent, or Firm* — Brinks Gilson & Lione (57) ABSTRACT

A system for detecting and preventing an imminent failure in a target system includes an interface, a processor in communication with the interface, and non-transitory computer readable media in communication with the processor. The interface receives training data items. Each item corresponds to either a service ticket or a machine-generated log that specifies an issue and a resolution to the issue. The instruction code is executed by the processor and causes the processor to group the training data items according to different categories. For each group, the processor trains a model to match the issue of each item of the group with the corresponding resolution and associates a model configuration of the trained model with the category of the group. The processor receives a sequence of new data items that include service tickets or machine generated logs for which a resolution is unknown. The processor groups the new data items according to one or more categories. For each category the processor determines one or more model configurations associated with similar categories; configures the model according to at least one of the model configurations; processes each data item of the group through the configured model; and communicates the resolution generated by the model to a user of the system to facilitate performance of (Continued)

remedial actions on the target system to thereby prevent an imminent failure of the target system.

16 Claims, 6 Drawing Sheets

(58) Field of Classification Search
USPC .................................................... 714/1–57
See application file for complete search history.

(56) References Cited

U.S. PATENT DOCUMENTS

| | | |
|---|---|---|
| 2015/0347212 A1* | 12/2015 | Bartley ................. G06N 20/00 714/37 |
| 2017/0255876 A1* | 9/2017 | Malatesha .............. G06Q 10/00 |
| 2018/0032971 A1 | 2/2018 | Karuppasamy |
| 2018/0067732 A1* | 3/2018 | Seetharaman ...... G06F 16/2358 |
| 2018/0150555 A1 | 5/2018 | Karuppasamy |
| 2018/0260760 A1 | 9/2018 | Srivastava et al. |
| 2018/0285768 A1 | 10/2018 | Karuppasamy |
| 2018/0307551 A1* | 10/2018 | Bacha ................. G06F 11/0709 |
| 2018/0322419 A1* | 11/2018 | Bugenhagen .......... G06N 20/00 |
| 2019/0130310 A1* | 5/2019 | Madhava Rao ...... G06F 16/245 |
| 2020/0005136 A1* | 1/2020 | Spryn .................... G06N 20/00 |
| 2020/0134423 A1* | 4/2020 | Shinde ................ G06F 11/0751 |

OTHER PUBLICATIONS

European Office action, dated Nov. 16, 2002, pp. 1-8, issued in European Patent Application No. 20155888.9, European Patent Office, Munich, Germany.

\* cited by examiner

METHOD AND SYSTEM FOR DETECTING AND PREVENTING AN IMMINENT FAILURE IN A TARGET SYSTEM

BACKGROUND

Field

This application generally relates to enterprise system maintenance. In particular, this application describes a method and system for detecting and preventing an imminent failure in a target system.

Description of Related Art

Small and large computer systems alike experience technical issues. Often times, these issues are manifested in strange ways that do not readily suggest a solution. Users of these systems may generate service tickets describing the issue they are having. The serviced tickets may be routed to IT staff associated with the systems to determine a resolution.

Sometimes, resolution to an issue is difficult to determine and it is only after some catastrophic system failure that the cause of the original issue can be determined. Unfortunately, such a failure usually results in unexpected downtime and loss of productivity and/or revenue that will continue to be incurred until the system is back up and running.

SUMMARY

In a first aspect, a system for detecting and preventing an imminent failure in a target system includes an interface, a processor in communication with the interface, and non-transitory computer readable media in communication with the processor. The interface receives training data items. Each item corresponds to either a service ticket or a machine-generated log that specifies an issue and a resolution to the issue. The instruction code is executed by the processor and causes the processor to group the training data items according to different categories. For each group, the processor trains a model to match the issue of each item of the group with the corresponding resolution and associates a model configuration of the trained model with the category of the group. The processor receives a sequence of new data items that include service tickets or machine generated logs for which a resolution is unknown. The processor groups the new data items according to one or more categories. For each category the processor determines one or more model configurations associated with similar categories; configures the model according to at least one of the model configurations; processes each data item of the group through the configured model; and communicates the resolution generated by the model to a user of the system to facilitate performance of remedial actions on the target system to thereby prevent an imminent failure of the target system.

In a second aspect, a method for detecting and preventing an imminent failure in a target system includes receiving training data items. Each item corresponds to either a service ticket or a machine-generated log that specifies an issue and a resolution to the issue. The method includes grouping the training data items according to different categories. For each group, the method includes training a model to match the issue of each item of the group with the corresponding resolution and associating a model configuration of the trained model with the category of the group. The method includes receiving a sequence of new data items that include service tickets or machine generated logs for which a resolution is unknown; and grouping the new data items according to one or more categories. For each category, the method includes determining one or more model configurations associated with similar categories; configuring the model according to at least one of the model configurations; processing each data item of the group through the configured model; and communicating the resolution generated by the model to a user of the system to facilitate performance of remedial actions on the target system to thereby prevent an imminent failure of the target system.

In a third aspect, a non-transitory computer readable media that stores instruction code for detecting and preventing an imminent failure in a target system. The instruction code is executable by a machine for causing the machine to receive training data items. Each item corresponds to either a service ticket or a machine-generated log that specifies an issue and a resolution to the issue. The machine groups the training data items according to different categories. For each group, the machine trains a model to match the issue of each item of the group with the corresponding resolution and associates a model configuration of the trained model with the category of the group. The machine receives a sequence of new data items that include service tickets or machine generated logs for which a resolution is unknown; and groups the new data items according to one or more categories. For each category, the machine determines one or more model configurations associated with similar categories; configures the model according to at least one of the model configurations; processes each data item of the group through the configured model; and communicates the resolution generated by the model to a user of the system to facilitate performance of remedial actions on the target system to thereby prevent an imminent failure of the target system.

DETAILED DESCRIPTION

The embodiments described below overcome the problems described above by providing a system that utilizes machine learning algorithms to continuously monitor service tickets and machine logs generated by a target system and suggests one or more potential resolutions to a detected issue. The system proactively alerts an operator of the target system of an impending failure. This allows the operator of the target system to address the potential failure in a way that minimizes or eliminates unplanned downtime and any loss of revenue incurred as a result.

Figure 1:
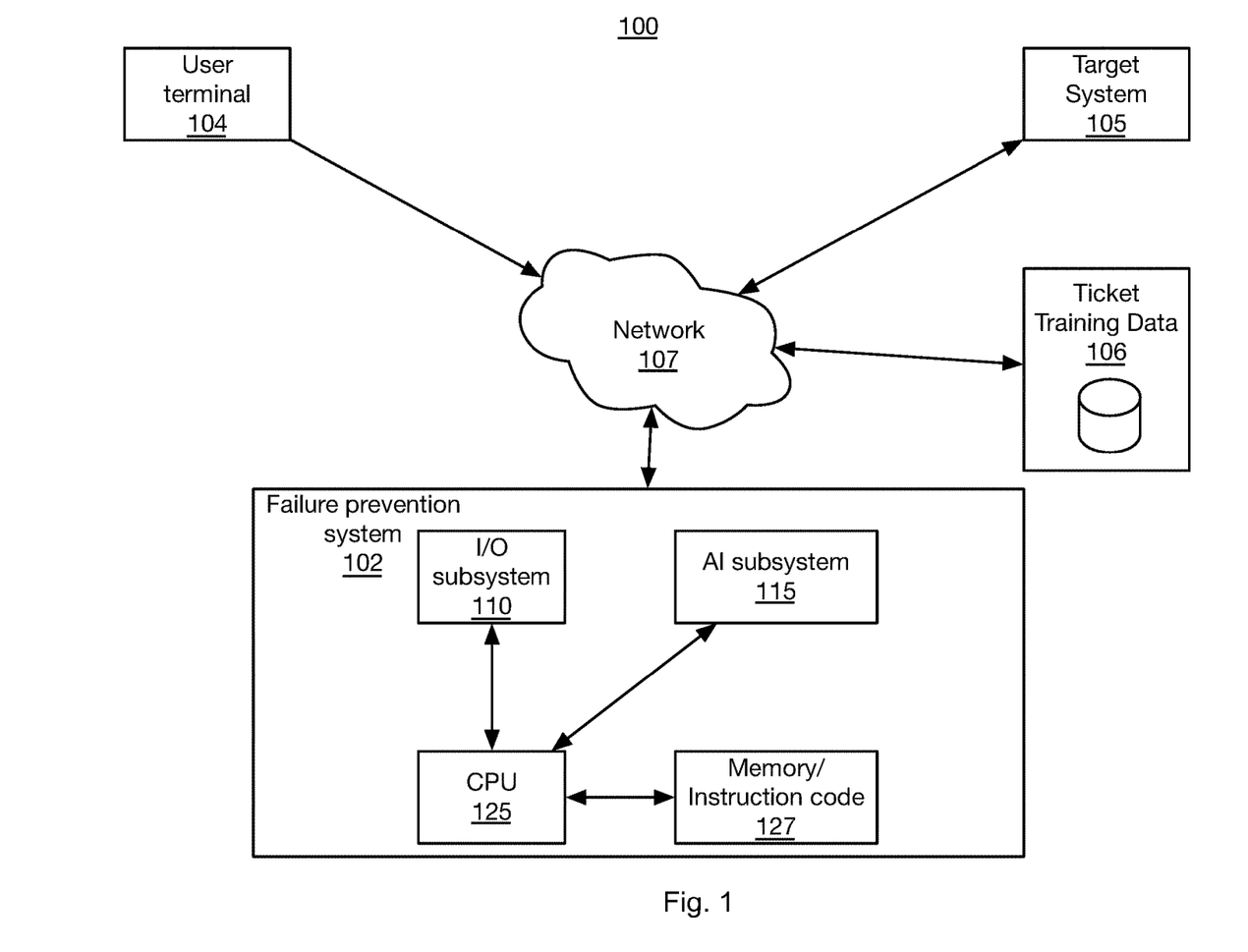
FIG. 1 illustrates an exemplary environment in which a failure prevention system (FPS) for detecting and preventing an imminent failure in a target system operates.

FIG. 1 illustrates an exemplary environment 100 that includes various systems/devices that facilitate detecting and preventing an imminent failure in a target system. Exemplary systems/devices of the environment 100 include a failure prevention system FPS 102, a user terminal 104, a target system 105, and ticket training data source 106.

The various entities of the environment 100 may communicate with one another via a network 107, such as the Internet and may correspond to computer systems such as an Intel®, AMD®, or PowerPC® based computer system or a different computer system and can include application specific computer systems. The computer systems may include an operating system, such as Microsoft Windows®, Linux, Unix® or other operating system. The terminals may be desktop PCs and/or mobile terminals.

The user terminal 104 may correspond to a computer that facilitates remote access to the FPS 102. To facilitate communicating information to the FPS 102, the user terminal 104 may implement one or more APIs. For example, the user terminal 104 may be configured to communicate with the FPS 102 via an API such as a webserver API, a SOAP-based web service, a RESTful API, and/or a different type of API.

The target system 105 may correspond to any computer system or computer system environment. Users of the target system 105 may generate service tickets detailing issues they are having with the target system 105. Machines logs indicative of the status of the target system 105 and/or issues being detected by the target system may be generated. In this regard, the target system 105 may be configured to facilitate communicating the service tickets and machine logs to the FPS 102 via one or more APIs of the FPS 102. For example, the target system 105 may be configured to communicate with the FPS 102 via an API such as a webserver API, a SOAP-based web service, a RESTful API, and/or a different type of API.

The ticket training data source 106 may correspond to any system that stores service ticket and machine log data. The service tickets and machine logs may be associated with disparate/unrelated systems. In this regard, the service tickets and/or machine logs may be represented in a structured format (e.g., a table) or directly ingested in real-time from one or more databases. Exemplary fields in the structured data that facilitate analysis of the tickets and/or machine logs may include: a ticket/incident number, a timestamp, a short description of an issue, an assignment group, a creation date, a resolution date, a configuration item, a priority, and a resolution to the issue.

In some implementations, certain fields may be required within the structure data to facilitate training various machine-learning models. For example, a user or machine that generates tickets and/or machine logs for processing by the system may have to specify attributes such as the incident number, the creation date, the timestamp, the short description of the issue, and the resolution of the issue. The user may further provide various optional attributes such as a detailed description, a priority, an assignment group, and/or other configuration items.

The ticket training data source 106 may be configured to facilitate communicating information with the FPS 102 via one or more APIs described above.

The FPS 102 may include a processor 125, input/output subsystem 110, and an AI subsystem 115. The FPS 102 may include other subsystems.

It is contemplated that the I/O subsystem 110, AI subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

The I/O subsystem 110 of the FPS 102 includes one or more input, output, or input/output interfaces and is configured to facilitate communications with entities outside of the FPS 102. In this regard, the I/O subsystem 110 may be configured to dynamically determine the communication methodology utilized by entities of the environment 100 and may communicate information to the entities with an interface that utilizes a determined communication methodology. For example, the I/O subsystem 110 may determine that a first entity utilizes a RESTful API and may, therefore, communicate with the entity using an interface that uses a RESTful communication methodology.

As described in more detail below, the I/O subsystem 110 may implement a web browser to facilitate generating one or more web-based interfaces through which users of user terminal 104, target system 105, and/or other systems may interact with the FPS 102. The web browser may implement a web services interface to facilitate automating some of the web-based functionality via a computer. For example, one or more of the entities of the environment 100 may utilize the web services interfaces to access information stored by the FPS 102 and/or to communicate information to the FPS 102.

The AI subsystem 115 may correspond to hardware specifically configured to perform or assist in the performance of various natural language processing techniques such as latent Dirichlet allocation (LDA) to identify topics associated with conversations, hierarchical density based cluster analysis (H-DBSCAN) to group conversations under one or more topics, Knuth-Morris-Pratt string searching to locate and extract occurrences of a certain words within conversations, possibly linear clustering algorithms to mine text data, and/or other techniques.

The AI subsystem 115 may be further configured to implement various machine learning models based on algorithms such as a Holt-Winters algorithm, an exponential time smoothing (ETS) algorithm, an artificial neural network (ANN), a seasonal auto regressive moving average (SARIMA) algorithm, a network of long short-term memories (LSTM), a gated recurring unit (GRU) algorithm. In this regard, each of the machine learning models may be trained to detect issues with a target system 105 and to provide suggested resolutions to the issues. This in turn may facilitate prevention of an imminent failure in a target system.

The CPU 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

Figure 2:
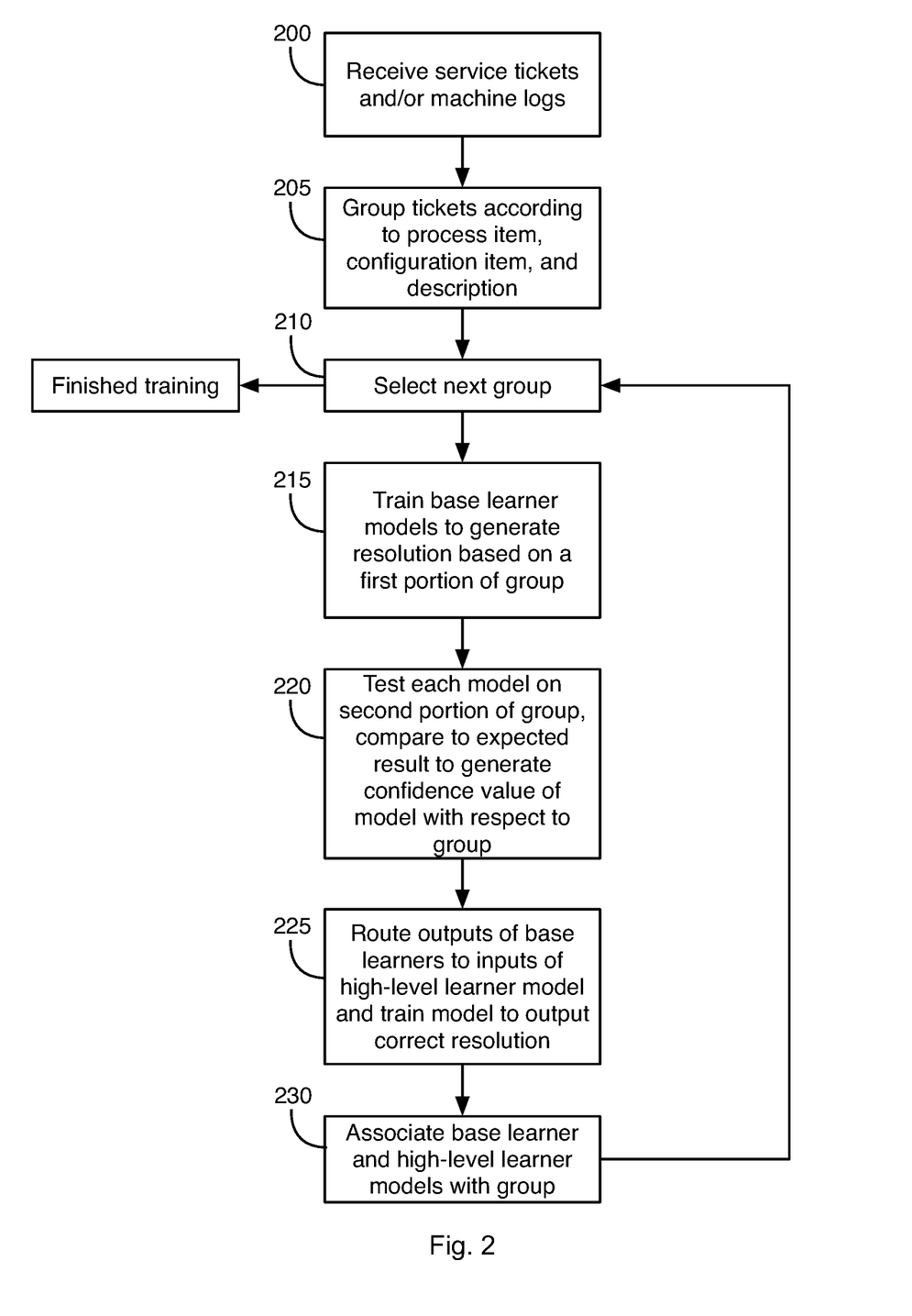
FIG. 2 illustrates operations performed by the FPS for training machine-learning models of the FPS.

FIG. 2 illustrates exemplary operations performed by the CPU 125 and/or other modules of the FPS 102 for training various machine-learning models to detect issues in a target system 105 and to provide one or more suggested resolutions to the issues. In this regard, the operations may be implemented via instruction code stored in non-transitory computer readable media 127 that resides within the subsystems configured to cause the respective subsystems to perform the operations illustrated in the figures and discussed herein. The operations of FIG. 2 are best understood with reference to the logical diagram of FIG. 3

Referring to FIG. 2, at operation 200, training data that includes service tickets 200 and/or machine logs 205 is ingested from the ticket training data 106. (See 300, FIG. 3). In some instances, the ingested data may be pre-processed by performing operations such as attribute mapping and selection, data sufficiency, frequency selection, accuracy and ranking score threshold, stop-words removal, punctuation and numbers removal, and stemming and lemmatization.

Figure 3:
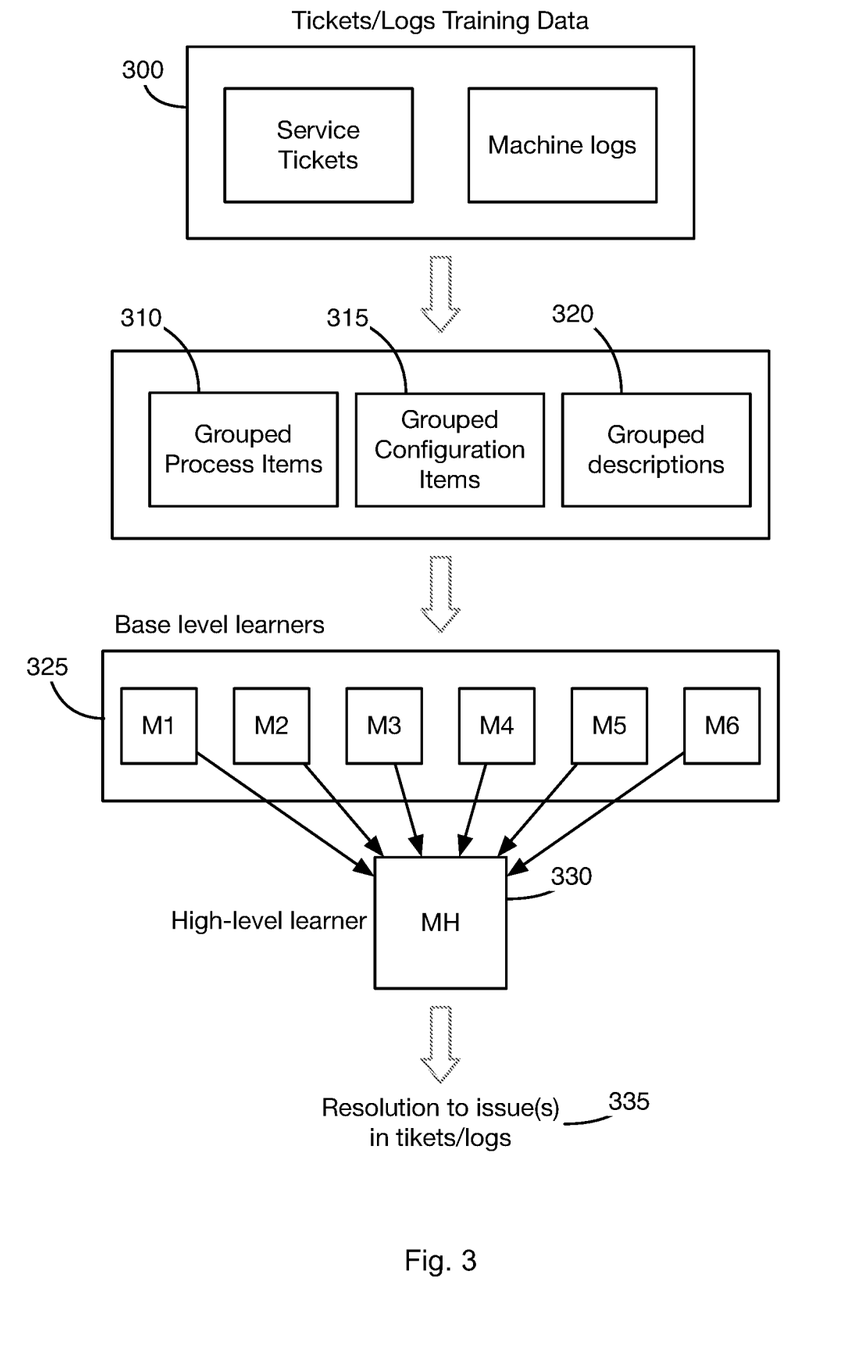
FIG. 3 logically illustrates training of the machine-learning models.

At operation 205, the tickets/logs may be grouped according to process item 310, configuration item 315, and description 320. Process item and configuration item grouping may be based on a corresponding business requirement. Exemplary process items include incidence, service request, exception type and similar process attributes. Exemplary configuration items include software applications, hardware details, locations assignment groups and similar configuration management database (CMDB) items. Description grouping may be based on semantic similarity between tickets/logs and based on frequency-based clustering techniques and/or other techniques for determining semantic similarity between ticket/log descriptions.

At operation 210, a first group may be selected.

At operation 215, a subset of the tickets/logs of the selected group may be input into several machine-learning models collectively referred to as base level learners 325. For example, half of the tickets/logs of the selected group may be input into the base level learners 325 as a sequence according to, for example, a timestamp associated with the tickets/logs. Each base level learner 325 may then be trained to output a resolution that was previously determined to be associated with the sequence of tickets/logs.

In one implementation each base level learner 325 may implement a different machine learning algorithm such as those described above. This may result in the match confidence associated with each base level learner 325 being different because some models may be better at predicting resolutions to issues of a particular nature than others. This is partly due to the nature of the issue and on various attributes of the ticket/logs such as how the ticket/logs were grouped, the frequency/timestamps associated with the tickets/logs, the priority levels associated with the tickets/logs, etc.

At block 220, a second subset of the tickets/logs of the selected group (i.e., the other half of the data) may be input into the base level learners 325 to validate the prediction accuracy of each base level learners 325. In this regard, a score may be attributed to each base learner 325 to indicate how often the base learner 325 predicted the correct resolution to an issue. (E.g., 10=always made correct prediction, 0=never made correct prediction).

At block 225, the outputs of the base level learners 325 are input into a model referred to as a high-level learner 330, which is then trained to output resolutions 335 to issues identified within the tickets/logs of the training data. That is, the high-level learner 330 is trained to make the correct resolution prediction based on the predictions of the base level learners 325.

At block 230, the configuration of the base level learners 325 and the high-level learner 330 may be saved within the FPS 102 and associated with the group of tickets that were processed. For example, various weights, coefficients, etc. that were adjusted in training the base level learners 325 and the high-level learner 330 may be saved. In addition, the prediction scores associated with the base level learners may be saved and used later to indicate a confidence of a suggested resolution.

The next group of tickets/logs may be selected at operation 210, and the operations from 215 to 230 repeated until all of the groups identified within the training data have been processed.

Figure 4:
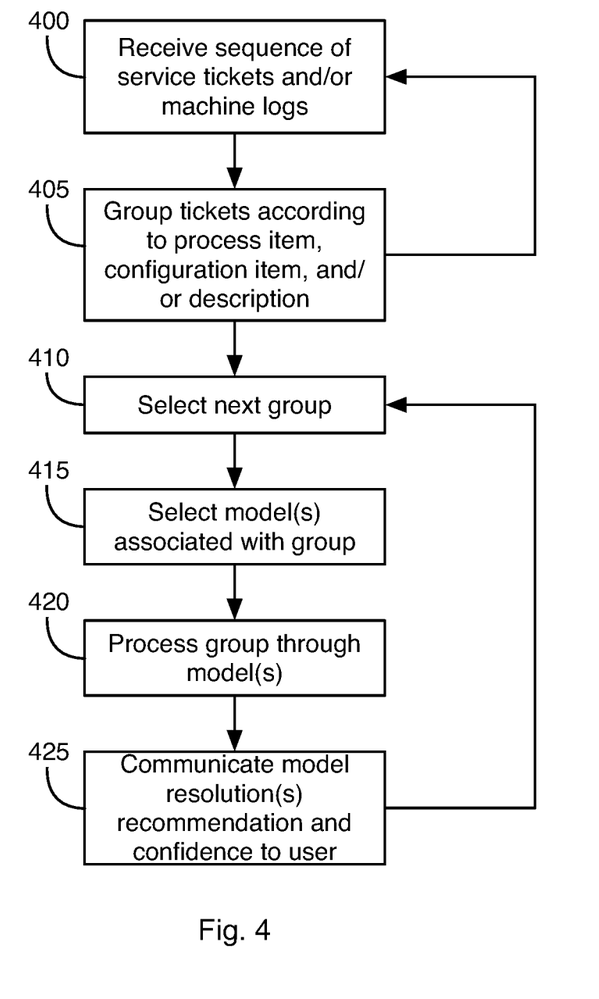
FIG. 4 illustrates operations performed by the FPS in determining resolutions to issues being experienced by the target system.

Operations implemented by the CPU 125 and/or other modules of the FPS 102 in detecting and facilitating the prevention of an imminent failure in a target system are illustrated in the FIG. 4. The operations may be implemented via instruction code stored in non-transitory computer readable media 127 that resides within the subsystems configured to cause the respective subsystems to perform the operations illustrated in the figures and discussed herein.

At operation 400, the FPS 102 may obtain logs/tickets from a target system 105. For example, the FPS 102 may communicate an interface 500 such as the interface illustrated in FIG. 5 to the user terminal 104. A user may then select a target system 105 via a target selection field 505 of the interface 500 to specify the target system 105 for analysis. The user may specify a date range associated with the dates on which tickets/logs of the selected target system 105 were generated. The user may then instruct the FPS 102 to obtain the desired tickets/logs from the target system 105.

The FPS 102 may then retrieve the tickets/logs from the target system 105. The tickets/logs may have been generated within the specified date range. Alternatively, a date range may have been omitted in which case the target system 105 may continually stream tickets/logs to the FPS 102 as they are generated.

At operation 405, the FPS 102 may group the tickets/logs according to process item 310, configuration item 315, and description 320. Process item and configuration item grouping may be based on a corresponding business requirement. Description grouping may be based on semantic similarity between tickets/logs and based on frequency-based clustering techniques and/or other techniques for determining semantic similarity.

At operation 410, the FPS 102 may select a first group.

At operation 415, the FPS 102 may determine a configuration of the base level learners 325 and the high-level learner 330 that is associated with the selected group. For example, the FPS 102 may determine one or more groups used in training the base level learners 325 and the high-level learner 330 that are similar to the group of tickets/logs currently being analyzed. Similarity of the selected group to one or more groups used in training the model may be determined by semantic similarity and its corresponding ranking score.

At operation 420, for each similar group, the FPS 102 may retrieve the corresponding configuration of the base level learners 325 and the high-level learner 330 that was saved during training, configure the base level learners 325 and the high-level learner 330 according to the retrieved configuration, and process the selected group through the configured base level learners 325 and the high-level learner 330.

Figure 5:
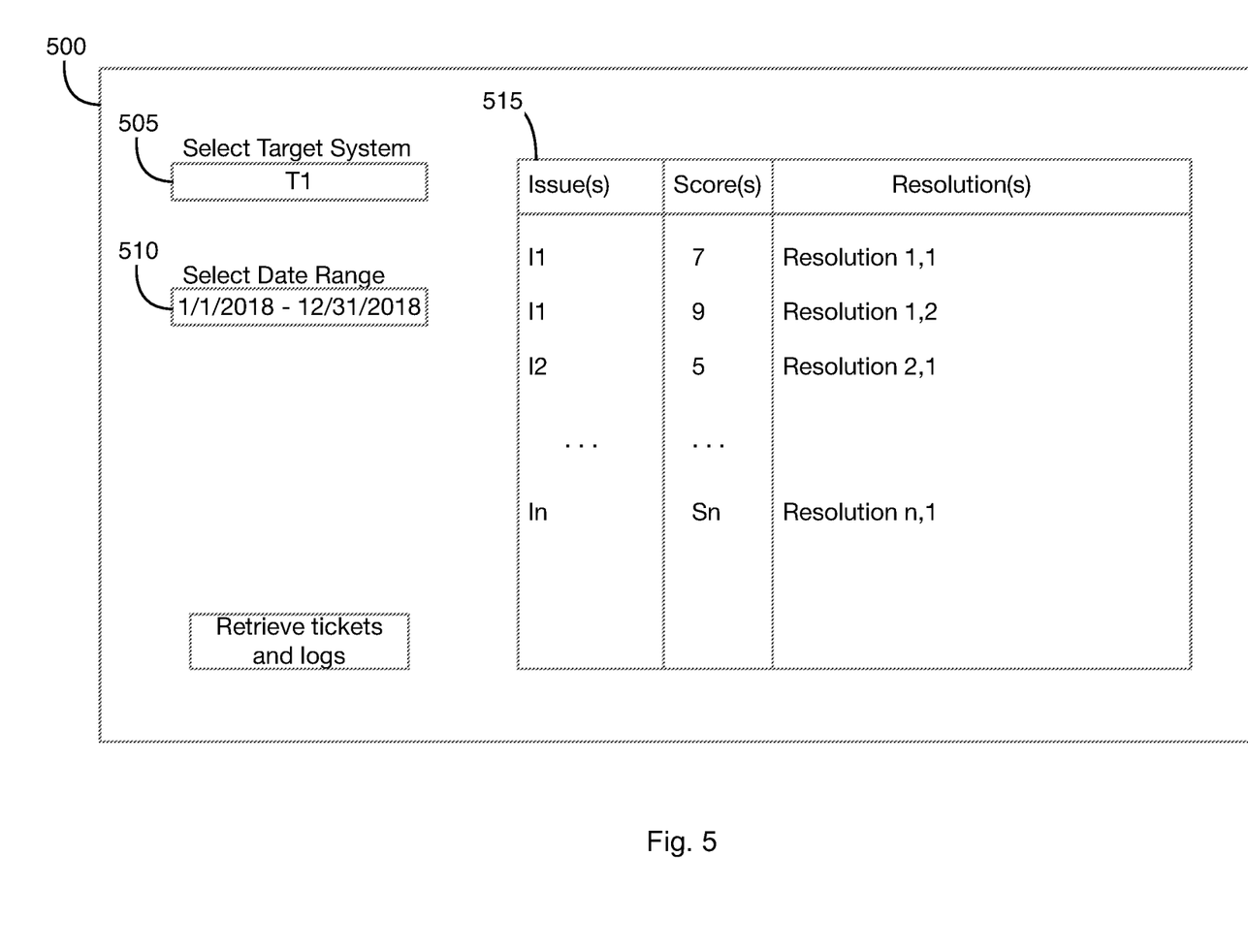
FIG. 5 illustrates an exemplary user interface generated by the FPS that facilitates selection of a target system and recommending resolutions to issues being experienced by the target system.

At operation 425, the issues identified by the ticket/logs of the group and the corresponding resolutions generated by the various model configurations may be presented to the user via a list 515 of the interface 400. The list 515 may further specify a score associated with the resolution recommendation indicative of a confidence that the resolution generated by the base level learners 325 and the high-level learner 330, as configured according to a similar group, will address the issue. The score may be derived from the prediction scores associated with the base level learners that were previously saved.

The operations may then repeat from operation 410 until all the groups identified with the tickets/logs have been evaluated.

Figure 6:
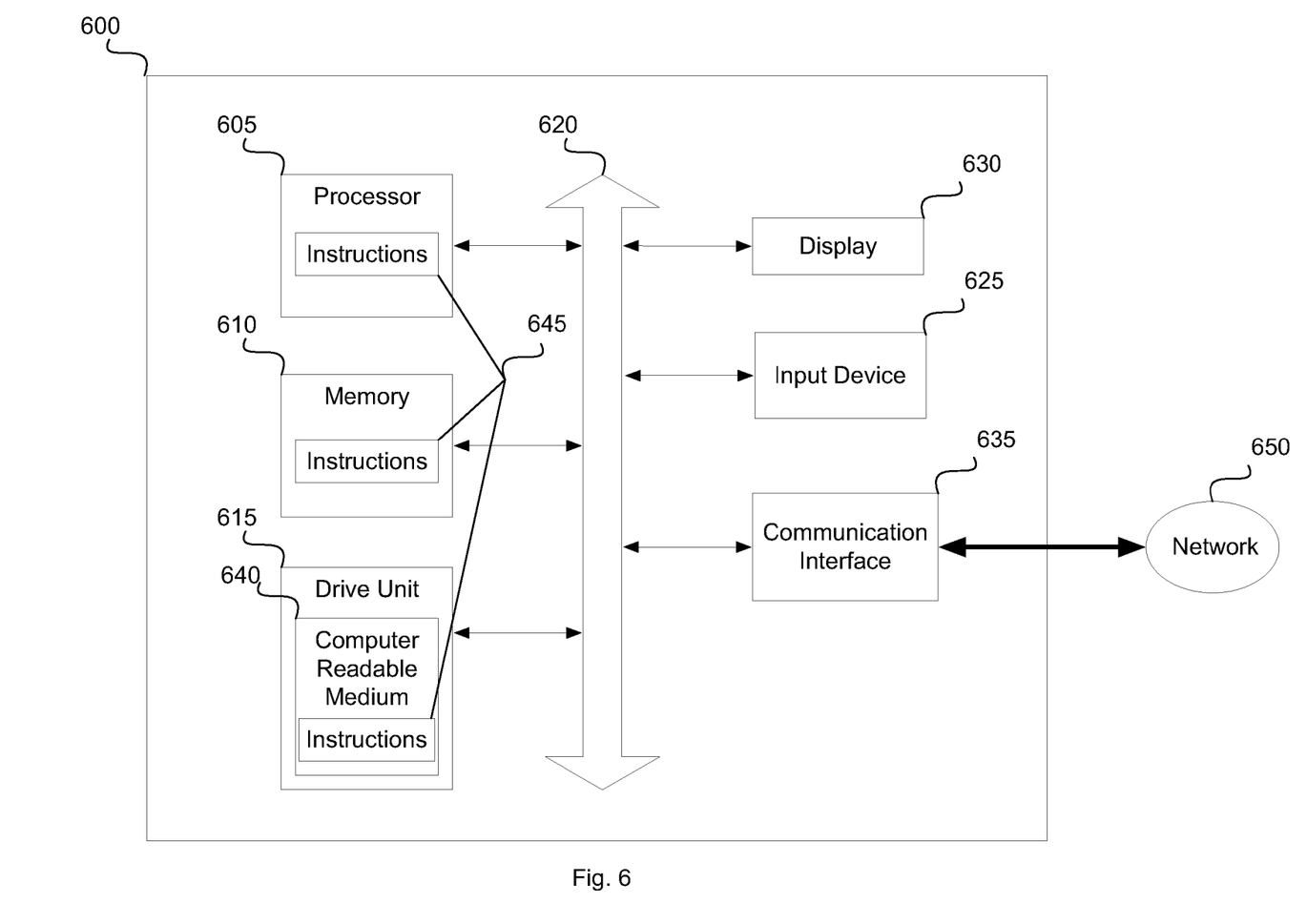
FIG. 6 illustrates an exemplary computer system that may form part of or implement the systems described in the figures or in the following paragraphs.

FIG. 6 illustrates a computer system 600 that may form part of or implement the systems, environments, devices, etc., described above. The computer system 600 may include a set of instructions 645 that the processor 605 may execute to cause the computer system 600 to perform any of the operations described above. The computer system 600 may operate as a stand-alone device or may be connected, e.g., using a network, to other computer systems or peripheral devices.

In a networked deployment, the computer system 600 may operate in the capacity of a server or as a client computer in a server-client network environment, or as a peer computer system in a peer-to-peer (or distributed) environment. The computer system 600 may also be implemented as or incorporated into various devices, such as a personal computer or a mobile device, capable of executing instructions 645 (sequential or otherwise) causing a device to perform one or more actions. Further, each of the systems described may include a collection of subsystems that individually or jointly execute a set, or multiple sets, of instructions to perform one or more computer operations.

The computer system 600 may include one or more memory devices 610 communicatively coupled to a bus 620 for communicating information. In addition, code operable to cause the computer system to perform operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see processing results produced by processor 605.

Additionally, the computer system 600 may include an input device 625, such as a keyboard or mouse or touchscreen, configured to allow a user to interact with components of system 600.

The computer system 600 may also include a disk or optical drive unit 615. The drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A system for detecting and preventing an imminent failure in a target computer system or computer system environment, the system comprising:
   an interface for receiving training data items, wherein each item corresponds to either a service ticket or a machine-generated log that specifies an issue and a resolution to the issue;
   a processor in communication with the interface; and
   non-transitory computer readable media in communication with the processor that stores instruction code, which when executed by the processor, causes the processor to:
      group the training data items according to different categories;
      for each group, train a model to match the issue of each item of the group with the corresponding resolution and associate a model configuration of the trained model with the category of the group, the model configuration being one of a plurality of different model configurations of the trained model, each of the model configurations being a different ensemble of base learner models and a high level learner model;
      receive a sequence of new data items that include service tickets or machine generated logs describing one or more issues for which a resolution is unknown;
      group the new data items according to one or more categories; for each category:
         determine one or more of the model configurations associated with similar categories;
         dynamically configure the model according to at least one of the model configurations, wherein the at least one of the model configurations is arranged in a respective ensemble for the each category, in a unique configuration having a plurality of the base learner models and a high-level learner model, each of the base learner models in the respective ensemble being trained to match the one or more issues of each of the new data items of the group with the corresponding resolution, and the high-level learner model in the respective ensemble being trained to match outputs of the base learner models to the corresponding resolution;

process each data item of the group through the configured model; and communicate the resolution generated by the model to a user of the system to facilitate performance of remedial actions on the target computer system or computer system environment to thereby prevent an imminent failure of the target computer system or computer system environment.

2. The system according to claim 1, wherein the base learner models in the respective ensemble correspond to one or more of: a Holt-Winters algorithm, an exponential time smoothing (ETS) algorithm, an artificial neural network (ANN), a seasonal auto regressive moving average (SARIMA) algorithm, a network of long short-term memories (LSTM), a gated recurring unit (GRU) algorithm.

3. The system according to claim 1, wherein the training data items are associated with a plurality of different target computer systems.

4. The system according to claim 1, wherein the training data items are associated with a plurality of different target computer systems or computer system environments.

5. The system according to claim 1, wherein the service tickets and machine-generated logs are grouped according to one or more business requirements associated with the service tickets and machine-generated logs.

6. The system according to claim 1, wherein each item in a group is input into the model according to a timestamp associated with the item.

7. A method for detecting and preventing an imminent failure in a target computer system or computer system environment, the method comprising:

receiving training data items, wherein each item corresponds to either a service ticket or a machine-generated log that specifies an issue and a resolution to the issue;

grouping the training data items according to different categories in a plurality of groups;

for each of the groups, training a model to match the issue of each item of a respective group with a corresponding resolution and associating a model configuration of the trained model with the category of the respective group, each model configuration having a different configuration of base learner models and a high-level learner model;

receiving a sequence of new data items that include service tickets or machine generated logs describing one or more issues for which a resolution is unknown;

grouping the new data items according to one or more categories; for each category:

determining one or more model configurations associated with similar categories;

configuring the model according to at least one of the model configurations by dynamically arranging a plurality of the base level learner models into a respective configured ensemble with a high level learner model to create an ensemble for the each category, wherein each base learner model in the respective configured ensemble is trained to match the issue of each item of the respective group with the corresponding resolution, and the high-level learner model in the respective configured ensemble is trained to match outputs of the base learner models to the corresponding resolution;

processing each data item of the group through the configured model; and communicating the resolution generated by the model to a user of the system to facilitate performance of remedial actions on the target computer system or computer system environment to thereby prevent an imminent failure of the target computer system or computer system environment.

8. The method according to claim 7, wherein the base learner models correspond to one or more of: a Holt-Winters algorithm, an exponential time smoothing (ETS) algorithm, an artificial neural network (ANN), a seasonal auto regressive moving average (SARIMA) algorithm, a network of long short-term memories (LSTM), a gated recurring unit (GRU) algorithm.

9. The method according to claim 7, wherein the training data items are associated with a plurality of different target computer systems or computer system environments.

10. The method according to claim 7, wherein the service tickets and machine-generated logs are grouped according to one or more business requirements associated with the service tickets and machine-generated logs.

11. The method according to claim 7, wherein each item in a group is input into the model according to a timestamp associated with the item.

12. A non-transitory computer readable media that stores instruction code for detecting and preventing an imminent failure in a target computer system or computer system environment, the instruction code being executable by a machine for causing the machine to:

receive training data items, wherein each item corresponds to either a service ticket or a machine-generated log that specifies an issue and a resolution to the issue;

group the training data items according to different categories;

for each of a plurality of groups, train a model to match the issue of each item of the group with the corresponding resolution and associate respective model configurations of the trained model with the respective category of the respective group, each of the respective model configurations comprising base learner models and a high-level learning model;

receive a sequence of new data items that include service tickets or machine generated logs describing one or more issues for which a resolution is unknown;

group the new data items according to one or more categories; for each category:

determine one or more model configurations associated with similar categories;

configure the model according to at least one of the model configurations, by dynamic configuration of an arrangement of a plurality of the base learner models into association with the high level learner model to create an ensemble for the each category, wherein each of the base learner models in a configured ensemble is trained to match the issue of each item of the respective group with the corresponding resolution, and the high-level learner model in the configured ensemble is trained to match outputs of the base learner models in the configured ensemble to the corresponding resolution;

process each data item of the group through the configured model; and communicate the resolution generated by the model to a user of the system to facilitate performance of remedial actions on the target computer system or computer system environment to thereby prevent an imminent failure of the target computer system or computer system environment.

13. The non-transitory computer readable media according to claim 12, wherein the base learner models correspond to one or more of: a Holt-Winters algorithm, an exponential time smoothing (ETS) algorithm, an artificial neural network (ANN), a seasonal auto regressive moving average (SARIMA) algorithm, a network of long short-term memories (LSTM), a gated recurring unit (GRU) algorithm.

14. The non-transitory computer readable media according to claim 12, wherein one or more of the base learner models in the configured ensemble include a training assistant AI module that implements machine learning techniques to identify training information related to a subject area of a respective category when the resolution is associated with a score being below a predetermined threshold level of accuracy.

15. The non-transitory computer readable media according to claim 12, wherein the training data items are associated with a plurality of different target computer systems or computer system environments.

16. The non-transitory computer readable media according to claim 12, wherein the service tickets and machine-generated logs are grouped according to one or more business requirements associated with the service tickets and machine-generated logs.

* * * * *